Dec. 14, 1926.
E. J. DOHERTY
TIRE CARRIER
Filed May 2, 1923
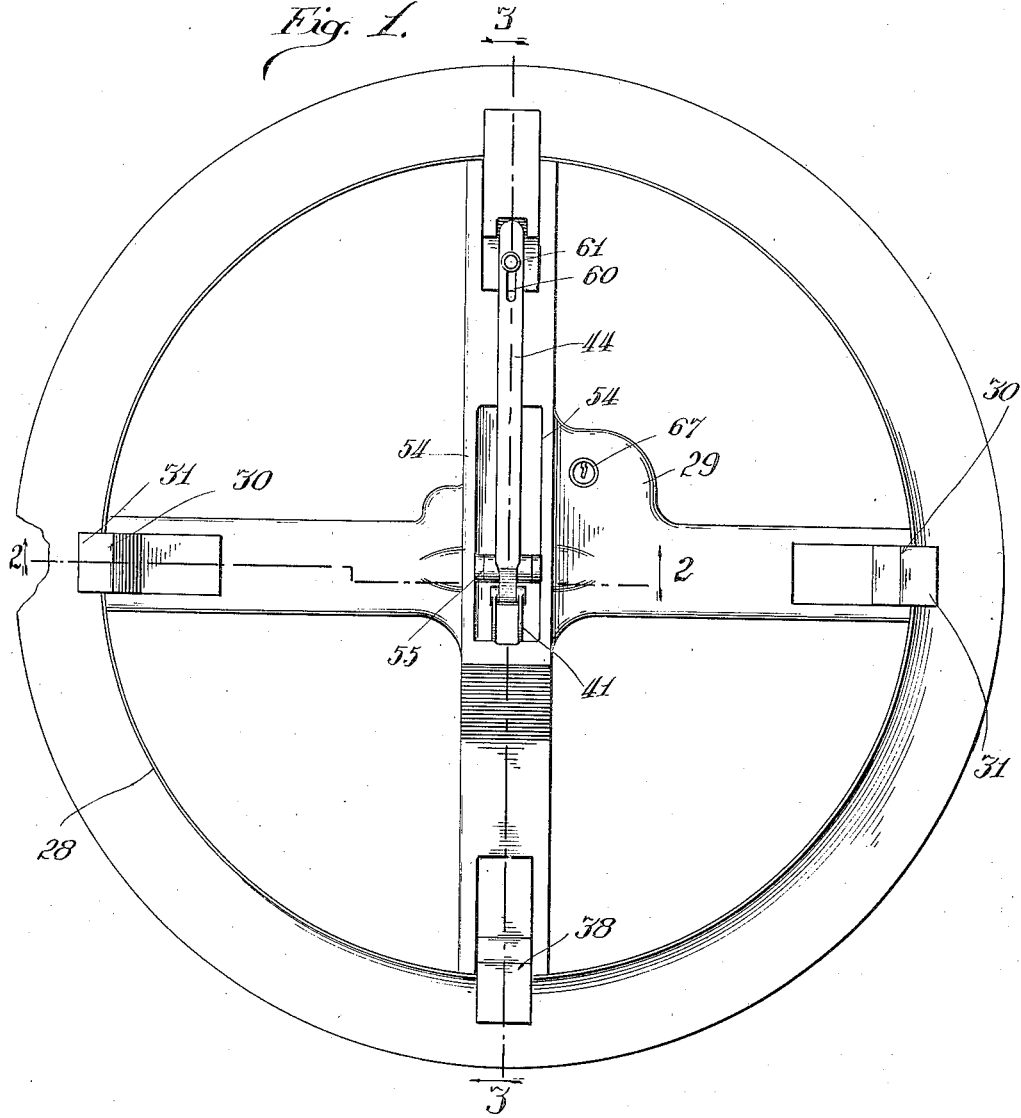
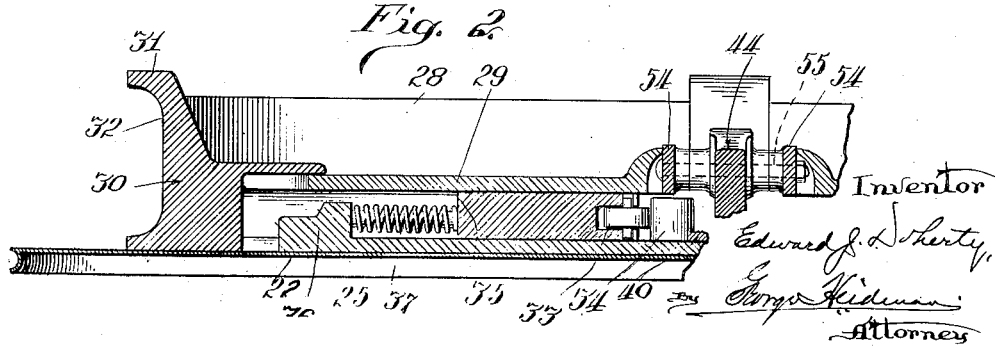

Dec. 14, 1926.
E. J. DOHERTY
1,610,493
TIRE CARRIER
Filed May 2, 1923      4 Sheets-Sheet 2
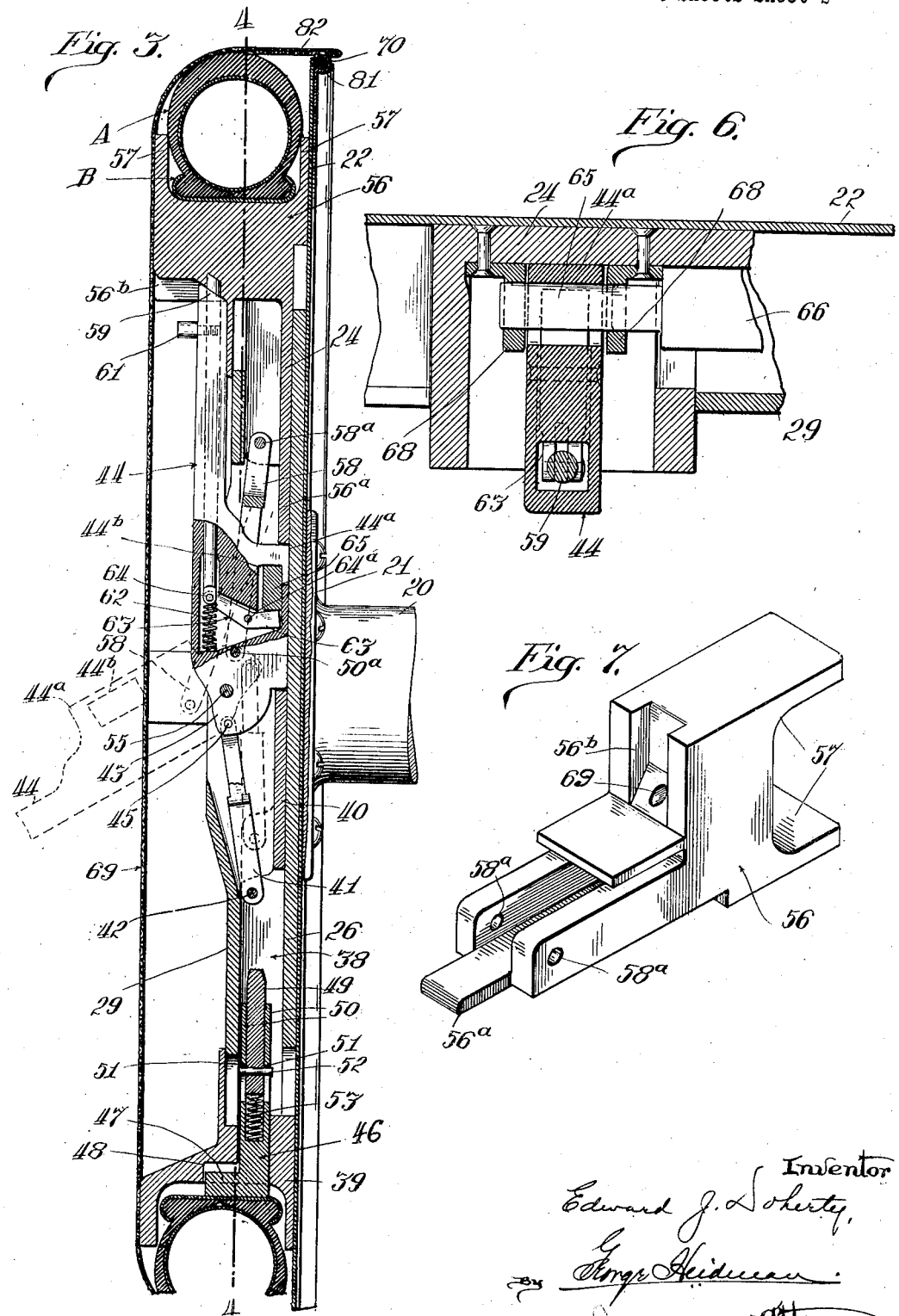

Dec. 14, 1926.  E. J. DOHERTY  1,610,493
TIRE CARRIER
Filed May 2, 1923    4 Sheets-Sheet 3

Inventor
Edward J. Doherty,
George Heidman
Attorney

Dec. 14, 1926.
E. J. DOHERTY
TIRE CARRIER
Filed May 2, 1923
1,610,493
4 Sheets-Sheet 4
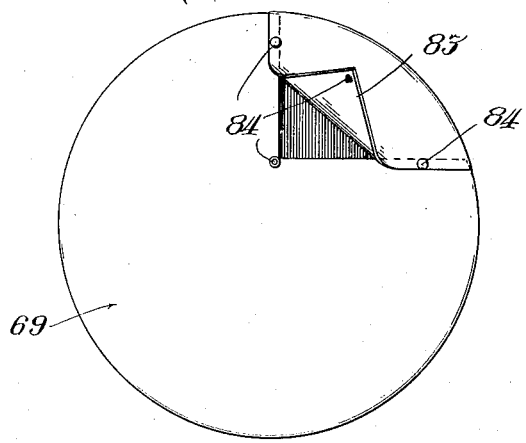
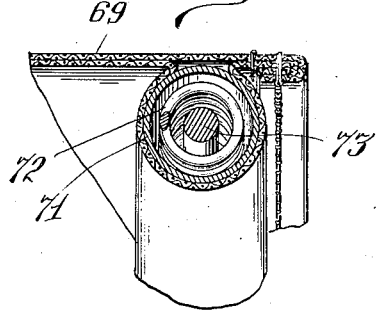
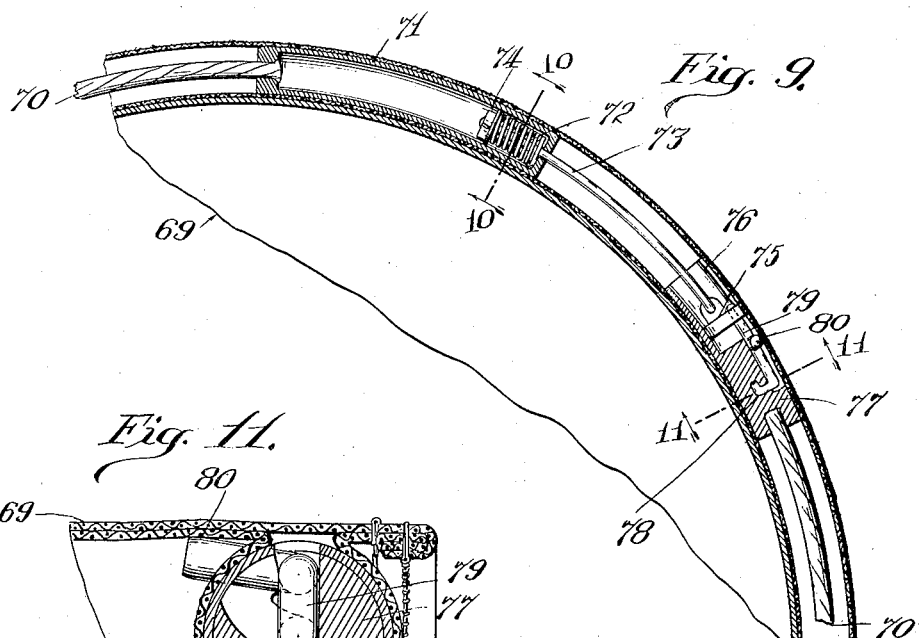
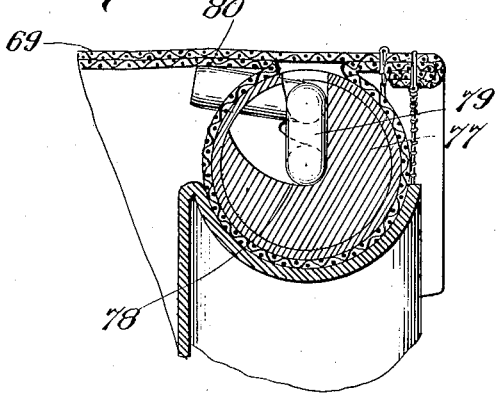

Patented Dec. 14, 1926.

1,610,493

UNITED STATES PATENT OFFICE.

EDWARD J. DOHERTY, OF CHICAGO, ILLINOIS.

TIRE CARRIER.

Application filed May 2, 1923. Serial No. 636,044.

My invention relates to a spare tire carrier for automobiles and the like, and has for its object the provision of a construction which will possess the requisite strength adapted to withstand misuse or attempts by unauthorized individuals seeking to remove the spare tire by attempting to force the tire-clamping elements of the carrier.

The invention also has for its object the provision of a construction whereby the tire will be firmly locked in place so as to prevent the accidental removal or any improper attempts to remove same without proper manipulation of the locking mechanism of the carrier; while at the same time providing a construction which will permit of the speedy removal of the spare tire upon actuation of the mechanism into releasing position and at the same time enable the placing of a tire onto the carrier in a comparatively short interval of time.

A further object of my invention is to provide a carrier which may be applied to any type of automobile; which will be sightly in appearance and which will in no way mar or permit the spare tire to mar the car.

The objects and advantages of my invention will all be more readily comprehended from the following detailed description of the drawings, wherein:—

Figure 1 is a plan view of my improved carrier provided with a tire and the outer covering of the carrier removed.

Figure 2 is a detail sectional view taken on the line 2—2 of Figure 1 looking in the direction of the arrows.

Figure 3 is a sectional view taken on the line 3—3 of Figure 1 looking in the direction of the arrows.

Figure 6 is a detail cross-sectional view taken on the line 6—6 of Figure 4 looking in the direction of the arrows.

Figure 7 is a detail perspective view of one of the tire-receiving jaws or holding elements, namely the one shown at the top in Figure 3.

Figure 8 is a plan view of the covering or slip-on cover.

Figure 9 is a sectional elevation of a segment of the cover.

Figure 10 is a detail sectional view taken on the line 10, 10 of Figure 9.

Figure 11 is a detail sectional view taken on the line 11, 11 of Figure 9 looking in the direction of the arrows.

Figure 4:
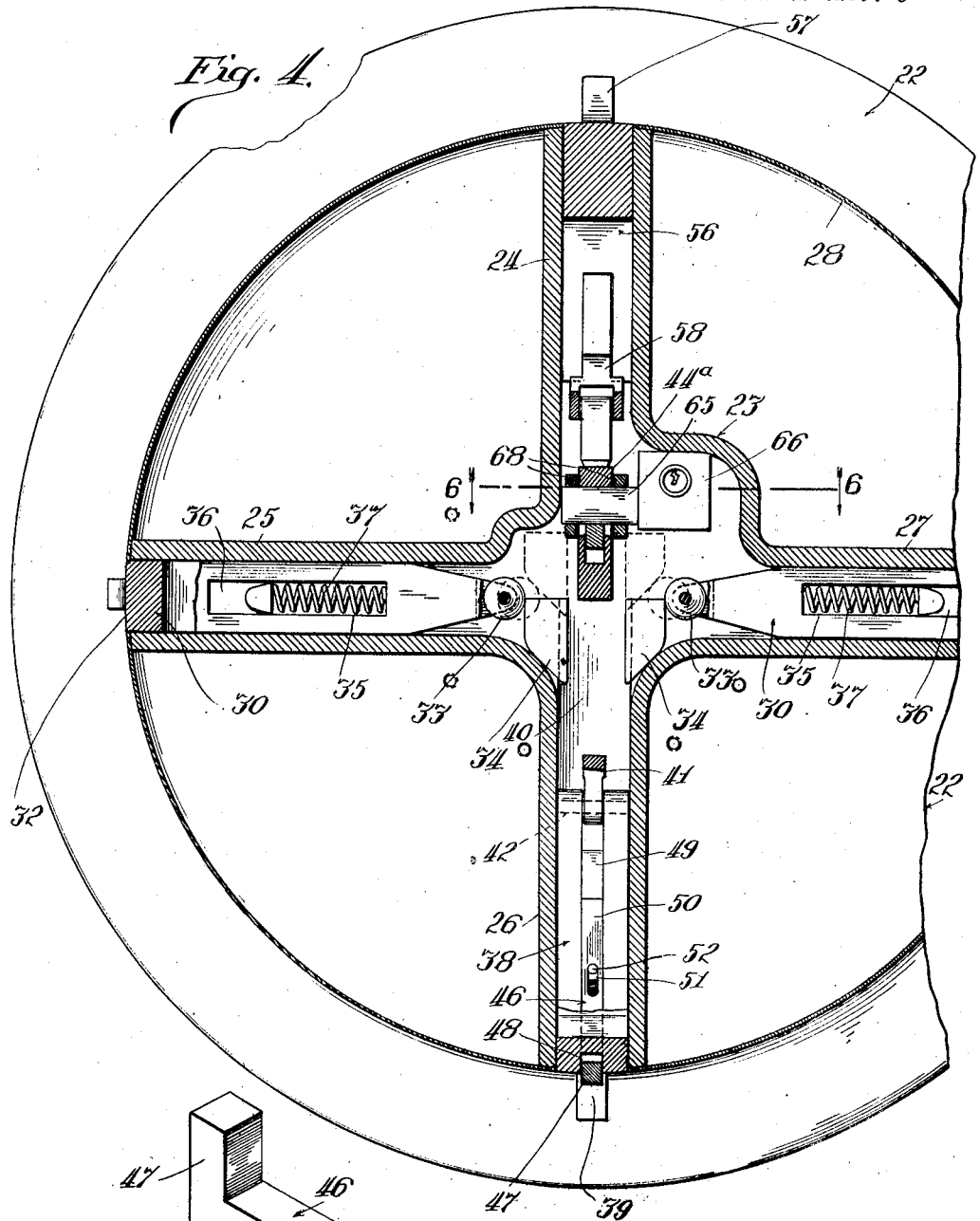
Figure 4 is a sectional view taken substantially on the line 4—4 of Figure 3 looking in the direction of the arrows but with the spare tire shown in elevation.

In the particular exemplification of the invention as disclosed in the drawings, my improved spare tire carrier, may be secured at any suitable place and in any suitable manner to the automobile, as for example by a bracket member 20 which may be riveted or bolted to the body or frame of the automobile; the bracket being shown in the nature of a post or hub provided with a flange 21 to which the back plate 22 of the carrier, preferably of sheet metal, is intended to be secured in such manner as to make removal impossible or difficult.

The carrier, which is preferably constructed of suitable metal, comprises a central housing or casing 23 provided with radially disposed hollow arms or portions 24, 25, 26 and 27 preferably arranged at equi-distances apart as shown and terminating at the periphery or outwardly disposed flange or rim portion 28 of the rear wall or plate 22; it being understood that the diameter of the circumferential flange or rim 28 is intended to conform more or less to the size tire employed and is preferably slightly less than the inner diameter of the spare tire and the demountable rim. The flange 28, at points coincident with the radially disposed arms or portions 24, 25, 26 and 27, is provided with suitable openings to receive the ends or jaws of the movable tire-holding members (later described) which are slidably mounted in the radially disposed hollow arms or portions 24, 25, 26 and 27.

The radially disposed portions or arms 24, 25, 26 and 27 are formed with side walls to provide slide-ways for the movable tire-holding elements; the radially disposed portions, as well as the central housing 23, being provided with a suitable cover plate 29 so as to enclose the movable elements.

The radially disposed portions or arms 25 and 27 are each provided with tire-clamping or holding members 30, 30, which may be identical in construction; the outer ends or jaws 31 of each clamping member 30 being socketed at 32 to conform more or less with the configuration of the inner perimeter of the tire or demountable rim, see Figure 2. The clamping members 30, 30 are of length to extend inwardly to a point adjacent to the center of the housing 23, as shown in Figures 2 and 4; and the inner ends are each provided with a suitable roller 33 which is adapted to contact with and ride on opposite sides of a movable cam-block 34. The sliding clamp members 30, 30 are each shown preferably provided with an elongated slot 35 adapted to receive a stop and guide block 36 secured to the back-wall of the carrier or rear portion of the radial arms. The slot 35, in each clamp member 30, is sufficiently long to receive a suitable pressure spring 37, one end whereof bears against and is preferably secured to the stop and guide block 36 while the other end bears against and is preferably suitably secured to the clamp member 30; the springs 37 being under compression to normally exert sufficient pressure on the clamp members whereby to force the latter radially inwardly toward each other.

Figure 5:
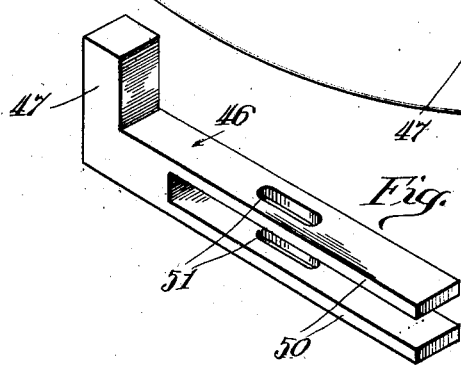
Figure 5 is a detail perspective view of a take-up or auxiliary holding element.

The arm or radially disposed portion 26 is provided with a clamp member 38 slidably mounted therein; the outer or jaw end 39 being substantially similar to the jaw 31 of clamp members 30; while the base portion of the clamp member 38 is extended toward the center of the housing as shown at 40 and each side of the base provided with a cam block 34, 34 with which the rollers 33 on the inner ends of the clamp members 30, 30 contact, as more clearly shown in Figure 4. The clamp member 38 is formed with a longitudinal slot adapted to receive the end of a link 41 which is pivotally secured at 42 to the clamp member, while the opposite end of the link is preferably bifurcated and receives the lower end 43 of a locking or operating lever 44. The link 41 is pivotally secured to the end 43 of the lever at the point 45, see Figure 3. The outer end 39 of the clamp member 38 is slotted to receive an auxiliary clamp or take-up member 46 (see Figure 3) and shown in detail in Figure 5; the auxiliary member 46 being provided with a head portion 47 adapted to recede into a suitable socket 48 in the outer or jaw end 39 of clamp member 38. The longitudinal slot of clamp member 38 is preferably formed so as to provide the transversely disposed web portion 49 which is intended to be straddled by the bifurcations 50, 50 of the auxiliary jaw or take-up member 46 as shown in Figure 3. The bifurcated end 50 of member 46 is shown provided with slots 51 for the reception of a pin 52 which is disposed through the web portion 49 of clamp member 38 and constitutes a stop for the outward movement of auxiliary member 46. The outward movement of member 46 is induced by a suitable coil spring 53 disposed between the bifurcations 50 of member 46 and the web portion 49 of clamp member 38. As is evident from the construction shown, with spring 53 under constant compression, auxiliary take-up member 46 is normally held outwardly as shown in Figure 3 and therefore in contact with the inner perimeter of the tire indicated at A, or the inner perimeter of the demountable rim indicated at B. The purpose of member 46 is to take up any slight play that might exist between the carrier and the tire or demountable rim due to slight variations in size and thus prevent the possibility of any slight vibration or rattle of the tire on the carrier. It will be understood that the jaws of the various clamp members are of sufficient depth to extend about opposite sides of the tire or demountable rim, when the clamp members are in distended condition, to prevent the removal of the tire.

The shell or housing 23 is formed with parallelly arranged spaced ribs or portions 54, see Figure 1, between which the operating lever 44 is pivotally secured at 55; the pivotal point 55 being slightly removed from the end of the lever as shown in Figure 3.

The radially disposed portion or arm 24 is provided with a clamp member 56 also slidably mounted and provided with a jaw portion 57 at the outer end adapted to extend about the sides of the tire, as shown in Figures 1 and 3; while the inner end of the clamp member 56 is shown slotted longitudinally (see Figure 7) to receive the end of a link 58 pivotally secured to member 56 at the point 58ª, while the opposite end of the link 58 is shown preferably bifurcated so as to straddle opposite sides of the operating lever 44 and to be pivotally secured thereto at the point 50ª, namely at a point normally slightly removed from and beneath the main pivot point 55 of the lever when it is in locking position as shown in full lines in Figure 3.

The lever 44 is preferably provided with a longitudinal channel therethrough to receive an auxiliary latch member 59 which extends longitudinally through the lever 44. The outer end of lever 44 is provided with a slot 60 for the passage of the finger grasp or button 61 secured to the auxiliary latch member 59 for the purpose of operating the latter. The inner pivoted end of lever 44 is shown enlarged on the side normally disposed toward the back wall of the carrier, with a portion of the enlargement chambered to receive a suitable spring 62 which tends to press auxiliary latch member 59 outwardly into latching position. The chamber or socket in the enlarged end of the lever 44 is also provided with a member 63 pivoted at 64 to the inner end of auxiliary latch member 59 and at a point 64ᵃ, intermediate of its ends to the operating lever 44. The enlarged portion 44ᵃ (which is partially shown in section in Figure 3) of lever 44 is provided with an opening disposed transversely therethrough, as shown at 44ᵇ in Figure 3 to receive a latch member or bolt 65 of a suitable key operated lock 66 which is secured within the housing or casing 23 adjacent to the path of the inner end of the clamp member 56.

The cover portion 29 of the housing is provided with an opening to receive the key-operated tumbler 67 whereby the bolt 65 is controlled. The shell or housing 23, at a point in alignment with the path of the bolt 65, is provided with a pair of apertured lugs 68 arranged suitable distances apart to permit the passage of the enlarged portion 44ᵃ of lever 44 therebetween, as shown in Figures 4 and 6. The opening 44ᵇ, in the enlarged portion of lever 44, is adapted to be brought into register with the openings or apertures in lugs 68 when the lever is in complete locking position, namely when it extends substantially parallel with the clamp member 56, with auxiliary latching plungers 59 in locking position; at which time the various openings will be brought into register for the passage of the bolt 65, which is of length sufficient to pass through both lugs 68 and the intermediate portion 44ᵃ of the operating lever 44 when the carrier is in locked condition.

In order to control the extreme inward movement of the various clamp members, I prefer to provide the base of the clamp member 56 with an extended end 56ᵃ which is adapted to slide intermediate of the lugs 68 and abut against the inner end of clamp member 38 and thus prevent further inward movement of the clamp member.

The clamp member 56, adjacent the outer end, is shown provided with an enlargement which is grooved or socketed as at 56ᵇ to receive the outer end of main operating lever 44 therebetween when the latter is in locking position; the end of the lever 44 and the enlarged portion of member 56 being preferably beveled for the purpose of firmly maintaining the outer end of operating lever 44 in place against any lateral or sidewise strains. The enlarged end of clamp member 56 is apertured at 69 to receive the end of the spring controlled plunger or auxiliary latch member 59.

As shown in Figure 3, the stop or lock member 63, which is pivotally secured to the inner end of auxiliary latch member 59, is intended to move into the opening 44ᵇ in the end 44ᵃ of lever 44 when the auxiliary latch member 59 is forced inwardly against the action of spring 62.

With lever 44 in its locking position shown in Figure 3, where auxiliary latch member 59 is inserted in aperture 68 of clamp member 56, it is apparent that when the master lock 66 is operated so as to move bolt 65 into locking position, the member 63 will be held against oscillation and therefore inward movement of auxiliary latch member 59 will be made impossible, because the end of member 63 will be in abutting relation with bolt 65 of the master lock 66. With this construction, double locking mechanism is provided, namely with bolt 65 inserted through the apertured lugs 68 and the aperture 44ᵇ of the lever 44 whereby movement of the lever would be impossible, while auxiliary locking means is provided by latch member 59, whose outer end is inserted in the opening 69 of clamp member 56, at which time the inner end of plunger member 59 is held against inward movement through the inability of pivoted member 63 to oscillate as one end thereof is in abutting relation with bolt 65.

In order to suitably cover and protect the spare tire or tires, I show the carrier in Figure 3 provided with an outer flexible covering or slip-on cover 69 of suitable fabric cut into proper circular form and provided with a circumferential hem, as more clearly shown in Figures 8 to 11, with the major portion of the hem provided with a flexible cord or wire, as at 70 in Figure 9, disposed throughout the circumferential hem. One end of the cable or cord is preferably securely fastened to one end of a small tubular housing or shell 71 having closed ends and also mounted in the hem of the fabric; the tubular housing or shell being provided with a coil spring 72. The opposite end of the shell or housing 71 is apertured for the passage of a rod 73, the inner end whereof has controlling relation, as for example by means of a head or washer 74, with the end of spring 72 which is farthest removed from said apertured end of the shell or housing; while the outer end of the rod 73 is connected to a disc 75 slidably mounted in a small tube 76 which is secured in the circumferential hem of the flexible cover. This tube 76 may be integral with or otherwise secured to a block 77 provided with a bayonet slot 78, in the main or straight portion whereof a bolt or slide member 79 is slidably mounted, with one end of the bolt 79 pivotally secured to the disc 75 so as to cause the latter to move with the bolt 79 when the latter is moved lengthwise. The bolt is provided with a finger-grasp or lug 80 which is adapted to be swung into the offset end of the slot-way 78 after the bolt has been retracted in a direction away from the spring containing tubular housing 71. The block portion 77 is firmly secured to the other end of the flexible cable or cord 70 in any suitable manner. With this construction it is apparent that when bolt 79 is drawn in a direction whereby spring 72 is compressed as shown in Figure 9, the tubing 71 will be yieldingly drawn toward the bolt-holding block 77 and therefore cause the cable or cord 70 to be drawn taut, which, therefore will prevent stretching or expanding of the circular hem or edge of the fabric. In other words, the circumference of the cover will be somewhat reduced and the circumferential edge or hem of the fabric with the enclosed cable or cord maintained in a suitable up-groove 81 formed in the metallic rear wall 22 of the carrier.

In order that the covering may properly fit over the outer circumference of the tire, I prefer to reenforce the fabric as at 82 in Figure 3 and thus at the same time also more or less assist in maintaining the general contour of the cover when the same is removed from the carrier. The cover, at the point where the tension-applying mechanism shown in Figure 9 is located, is preferably provided with a flap portion 83, which may be stitched or secured along one of its edges, as for example the circumferential edge, to the fabric constituting the main portion of the cover, while the free ends of the flap may be held in place (after the cover has been put into position) by means of suitable snap buttoms as at 84 in Figure 8.

The operation of the carrier for the purpose of removing or replacing a tire thereon is extremely simple and may be accomplished in a comparatively short space of time, by simply releasing the flap 83 of the cover so as to make the bolt 79 accessible, rotating the bolt so as to move its lug or finger portion 80 out of the angularly disposed portion of the slot-way, which will cause the bolt to move toward the open end of the shell 76, through the action of spring 72, thereby causing the cord or cable 70 to relax. This will enable the corded hem of the cover to be easily forced out of the groove 81 of the metal back of the carrier. Upon rotating tumbler 67 by means of a suitable key so as to withdraw bolt 65 out of registering openings in the lugs 68 and the inner end of operating lever 44, the withdrawal of bolt 65 will then permit operation of auxiliary latch member 59 upon the exertion of pressure on finger release 61 against the action of spring 62, as the member 63 is now free to oscillate into the opening 44ᵇ because of the withdrawl of bolt 65. Upon sufficiently swinging lever 44 out of parallel relation with the clamp member, namely into the position shown in dotted lines in Figure 3, the clamp members 38 and 56 will be drawn inwardly toward each other through the action of links 41 and 58, respectively, due to the positioning of their respective pivotal points 45 and 59 on the end of the lever relative to the pivoted point 55 of the lever, thus causing pivotal point 45 to swing to the right of the main pivotal point 55 of the lever, as viewed in Figure 3, while the pivotal point 59 of link 58 will swing to the left of the main pivotal point 55 of lever 44. Such movement of the links will draw the clamp members 38 and 56 entirely inward and move the jaw portions thereof out of holding relation with the sides of the tire and this inward movement of clamp member 38 causes the cam blocks 34, carried thereon, to be moved inwardly, namely upward in Figure 4, so as to permit the rollers 33 at the inner ends of clamp members 30, 30 to ride down the inclined surfaces of the block and allow the jaws of members 30, 30 to be drawn inwardly out of holding relation with the sides of the tire through the action of the springs 37, 37 which are constantly exerting an inward pressure as previously described.

It is apparent that the operation of releasing or of replacing a tire on the carrier can be quickly accomplished, while at the same time the tire will be securely locked in place against any possibility of removal. In placing a tire onto the carrier, the tire is first inserted onto the jaw of clamp member 38 so as to force the take-up member 46 inwardly against the action of the spring 53 and then onto the flange or rim 28 and therefore over the other clamp members before the clamp members are forced outwardly induced by the inward movement of lever 44; the member 46 being held in firm contact with the inner perimeter of the tire or its rim and taking up any slight play that might exist between the tire and the clamp members of the carrier.

As an exemplification of my invention, I have shown a carrier for a single tire, but it is apparent that the clamp members may be so constructed as to adapt them to a number of tires without necessitating any material change in the general construction and operation of the invention which has been described in terms employed merely as terms of description and not as terms of limitation, as modifications are possible and may be made without, however, departing from the spirit of my invention.

What I claim is:—

1. A tire carrier, comprising a plurality of radially movable jaw-members, a lever pivotally secured intermediate of the inner ends of two of the jaw members and operatively connected therewith so as to cause said members to move inwardly toward each other when the lever is swung in one direction and to move outwardly in opposite directions when the lever is swung in a second direction, means intermediate of the inner ends of the two first mentioned jaw members and the jaw members on opposite sides of the median line of the two first mentioned jaw members whereby the second mentioned jaw members are simultaneously actuated, and key operated means adapted to engage with and to lock said lever when the lattter has been moved in said last mentioned direction.

2. A tire carrier, comprising a main shell or housing, a plurality of radially movable tire engaging members slidably mounted in the housing, a lever pivoted adjacent to the center of said housing and the inner ends of said members and operatively connected with two of said tire engaging members so as to move the latter into and out of tire holding position, means actuated by the first mentioned members whereby a second portion of said members is controlled through the positioning of the first mentioned pair, yielding means normally tending to force said second pair of members inwardly, and key operated means adapted to effect locking relation with the inner end of said lever when said tire engaging members have been moved outwardly into tire holding position.

3. A tire carrier, comprising a plurality of tire-engaging members arranged to move in a radial direction, a lever having link connection with two of said tire-engaging members and adapted to move the latter radially in opposite directions into and out of tire-holding position, means whereby the pair of members arranged at right angles to the first mentioned pair are normally forced inwardly, means intermediate of the inner ends of said last mentioned pair and one of the members of the first mentioned pair whereby the second mentioned pair of members are forced outwardly when the member of the first mentioned pair moves outwardly, and key-operated means adapted to effect locking relation with said lever when the lattter has been moved to force the first mentioned pair of members outwardly into tire-holding position.

4. A tire carrier, comprising a body portion provided with radially disposed arms, a tire-engaging member slidably mounted in each arm, a lever pivotally mounted in said body portion, the pivoted end of said lever having controlling relation with two of said tire-engaging members so as to cause said members to move outwardly when said lever is swung into a position substantially parallel with one of said members, means intermediate of one of the last mentioned members and a second pair of said members whereby the position of the latter is determined by the position of said member of the first mentioned pair, and key-operated means adapted to effect locking relation with the pivoted end of said lever when the latter has been swung into position substantially parallel with one of the tire-engaging members.

5. A tire carrier, comprising a body portion having a tire receiving circumferential flange, a plurality of tire-engaging members slidably mounted in said body portion so as to move in radial directions, two of said members being spring-controlled so as to normally move inwardly, a lever pivoted adjacent one end to said body portion so as to swing in a direction substantially parallel with a second pair of said tire-engaging members, the pivoted end of said lever having link connection with said last mentioned pair of tire-engaging members whereby the position of the latter is controlled, means intermediate of one of said last mentioned pair of tire-engaging members and the first mentioned spring controlled members whereby the latter are forced outwardly, when said last mentioned tire-engaging members move outwardly, and a key-operated member adapted to pass through the pivoted end of said lever when the latter has been swung into a position substantially parallel with one of said first mentioned tire-holding members and said members are in tire-holding position.

6. A tire carrier, comprising a body portion adapted to be secured to a vehicle, said body portion being provided with radially disposed channels, a tire-holding member slidably mounted in each channel, two diametrically opposite members being arranged to normally move inwardly, a lever pivoted to said body portion and having link connection with a second pair of said members, disposed at right angles to the first mentioned pair, whereby the position of said second mentioned pair of members is controlled, means intermediate of one of the members of said second mentioned pair and the inner ends of the members and the first mentioned pair whereby the latter are forced outwardly when said second mentioned pair of members move outwardly, and a key-controlled bolt mounted in said body portion and arranged to pass through said lever when the latter has moved said tire-engaging members into tire-holding position.

7. A tire carrier, comprising a body portion adapted to be secured to a vehicle, said body portion being provided with radially disposed channels, a tire-engaging member slidable in each channel, a lever pivoted in said body portion adjacent to the inner ends of said tire-engaging members, means intermediate of the inner ends of two of said tire-engaging members and the lever whereby said members are drawn inwardly when the lever is swung into one position and said members forced outwardly when said lever is swung into a second position, means intermediate of one of said last mentioned pair of members and the inner ends of a second pair of said tire-engaging members whereby the position of the latter is controlled, means carried by said lever adapted to effect latching relation between the lever and one of said tire-engaging members when the latter are in tire-holding position, and key-controlled means secured to said body portion and adapted to engage said lever and with a portion of the last mentioned means whereby the lever and said means will be locked against movement.

8. A tire carrier, comprising a body portion adapted to be secured to a vehicle and provided with radially disposed slots, a tire-engaging member slidably mounted in each slot, a lever pivotally secured at one end to said body portion at a point adjacent the inner ends of said tire-engaging members, said lever having link connection with the two members arranged in alignment with each other whereby the latter are moved into and out of tire-holding position, spring and cam mechanism whereby a second pair of the tire-engaging members are controlled and caused to move into and out of tire-engaging position when the first two mentioned pair of members have been actuated, a spring-controlled take-up member carried by one of said tire-engaging members, and key-operated means adapted to move into locking relation with the pivoted end of said lever when the tire-holding members have been moved outwardly into tire-holding position.

9. In a tire carrier, a body portion adapted to be secured to a vehicle, a plurality of radially movable tire engaging members slidably mounted in the body portion, a lever pivoted adjacent to one end to the body portion and provided with an apertured enlargement at the pivoted end thereof, a pair of apertured lugs secured to the body portion and adapted to receive the enlargement of the lever therebetween, link connection between the lever and a pair of said members whereby the latter are withdrawn from tire engaging position when the lever is moved in one direction and the members forced into tire-engaging position when the lever is moved in a second direction, and a key controlled bolt slidable in the body portion and adapted to pass through the apertured lever enlargement and the apertured lugs on opposite sides of the lever.

10. In a tire carrier, a body portion comprising an annular back plate adapted to be secured to a vehicle and having a circumferential tire holding flange, a plurality of radially movable tire engaging members slidably mounted on the back plate and provided at the outer ends with tire receiving sockets, a lever pivoted to the body portion adjacent to the inner ends of said members and having link connection with said members whereby the positions of the latter are controlled, key operated means secured to the body portion adjacent to the pivoted end of the lever whereby the latter may be locked against movement ofter the members have been moved into tire engaging position.

11. In a tire carrier, a body portion adapted to be secured to a vehicle, radially movable tire engaging members adapted to move in unison, a lever pivoted to the body portion and having operative connection at its inner end with certain of the members whereby the latter are caused to move into or out of tire engaging position, latching means movable lengthwise of said lever whereby the free end of the latter may be held against movement when the members have been moved into tire engaging position, and key operated means slidable in the body portion in proximity to the pivoted end of the lever and adapted to pass through the latter and to hold said latching means against movement.

12. In a tire carrier, a body portion adapted to be secured to a vehicle and provided with a tire receiving circumferential flange, a plurality of radially movable tire engaging members adapted to move in unison, a lever pivoted at one end to the body portion and having operative connection with some of said members whereby movement of the latter is controlled, auxiliary latching means carried by the lever whereby its free end is locked to one of said members, and a master lock adapted to engage with the lever and with said latching means.

13. A tire carrier, comprising a body portion adapted to be secured to a vehicle, a plurality of radially movable tire engaging members, a portion of said members being under spring pressure so as normally to move inwardly, a lever pivoted at one end to the body portion, link connections between the lever and a second portion of said members whereby the latter are actuated, means intermediate of the inner ends of the first mentioned portion of members and a member of the second mentioned portion whereby the first mentioned portions are forced outwardly when the second portion of members moves outwardly, and locking means whereby said lever may be locked against movement when all of said members have been moved outwardly into tire engaging position.

14. A tire carrier, comprising a body portion adapted to be secured to a vehicle, a plurality of tire engaging members adapted to move radially into and out of tire holding position, a lever pivoted to said body portion and operatively connected with a portion of said members, a second portion of said members being adapted to be moved into tire holding position by a member of the first mentioned portion, a spring controlled take-up plunger carried by one of the members, and key operated means whereby said lever may be locked against movement after the members have been moved into tire holding position, 15. A tire carrier comprising an annular plate adapted to be secured to a vehicle, the perimeter of the plate being provided with a circumferential cover-rim receiving groove, tire-holding members slidably mounted on the outer face of the plate so as to move radially in opposite directions, the outer ends being formed to engage opposite sides of the tire, a lever pivoted adjacent to the center of said plate and the inner ends of said tire-holding members and operatively connected with two of said members so as to move the latter into and out of tire-holding position, means actuated by the first mentioned members whereby a second portion of said members is controlled through the positioning of the first mentioned pair, yielding means normally tending to force said second pair of members inwardly, and key-operated means adapted to pass transversely of the lever and thereby lock the latter when said tire-engaging members have been moved outwardly into tire-holding position.

EDWARD J. DOHERTY.